United States Patent [19]
Landwehr et al.

[11] Patent Number: 5,892,901
[45] Date of Patent: Apr. 6, 1999

[54] SECURE IDENTIFICATION SYSTEM

[75] Inventors: Carl E. Landwehr, McLean; Daniel L. Latham, Gainesville, both of Va.

[73] Assignee: The United States of America as represented by the Secretary of the Navy, Washington, D.C.

[21] Appl. No.: 872,316

[22] Filed: Jun. 10, 1997

[51] Int. Cl.$^6$ .................................................. G06F 11/00
[52] U.S. Cl. ............................................................ 395/186
[58] Field of Search .............................. 395/186, 187.01, 395/188.01, 200.59, 185.08, 185.04; 371/25.1, 22.1; 370/216

[56] References Cited

U.S. PATENT DOCUMENTS

| | | | |
|---|---|---|---|
| 4,477,870 | 10/1984 | Kraus .......................................... | 371/25 |
| 5,712,973 | 5/1996 | Dayan et al. ............................ | 395/186 |
| 5,715,390 | 11/1995 | Hoffman et al. ......................... | 395/186 |
| 5,737,416 | 8/1994 | Cooper et al. ........................... | 395/186 |

OTHER PUBLICATIONS

Advertisement, Secure Your Valuables with Smart Clips, clipped from an airline magazine, Apr., 1996.
iButton Overview, internet advertisement from http://www.ibutton.com, dated Feb. 27, 1997.
MicroStamp Engine, undated internet advertisement.
Readers and Antennas, TIRIS Products and Technologies, Texas Instruments, internet advertisement dated Feb. 27, 1997, http://www.ti.com.
The Olivetti Active Badge System, internet advertisement, undated, ©1996.
Cautious Optimism Greets 'Smart Gun' Debut, The New Gun Week, Oct. 10, 1996, p. 1.

*Primary Examiner*—Robert W. Beausoliel, Jr.
*Assistant Examiner*—Pierre E. Elisca
*Attorney, Agent, or Firm*—Thomas E. McDonnell; Edward F. Miles

[57] ABSTRACT

A system in which two circuits which are spatially mobile with respect to one another communicate with one another over a preselected range to identify themselves. So long as the communication remains, one of the circuits, called a detector, maintains the input/output of a third circuit enabled. Upon breaking communication, for example by one of the circuits moving outside the preselected range, input/output of the third circuit is disabled. In one embodiment, the third circuit is a computer workstation to which the detector is affixed, and the other circuit, called the agent, is worn or carried by an authorized user of the workstation. This permits the workstation to be available to the user while he is present, and become unavailable in general when he is not.

13 Claims, 5 Drawing Sheets

SIZE APPROX. 2 INCHES BY 1 INCH BY 1/2 INCH

SECURE IDENTIFICATION SYSTEM

BACKGROUND OF THE INVENTION

Present ways to secure use of circuits such as a computer workstation require overt actions on the part of the user, either entering a password, unlocking a machine physically, placing a token (e.g. a card, badge, button, etc.) in a reader connected to the system, or some similar operation. In environments where users frequently walk up to workstations, perform a brief transaction, and leave, any of these modes of operation is a substantial inconvenience. Where password entry is required, other people in the vicinity may be able to see what the user has typed and imitate it later. Password systems themselves are a substantial vulnerability because users are allowed to choose passwords, they typically choose weak (easy to guess) ones, and if they are assigned passwords, they are prone to write them down where they may be seen by others. Systems that avoid this problem by requiring a new password each time generally require users to carry either a special card or a list of passwords from which the user must determine the correct password to enter, another inconvenience. Further, once the act of identification is performed (e.g. the password is entered or token inserted), if the user leaves the workstation for any reason, another overt act is required to disable the workstation again: the user must log out, remove the token from the reader, etc., and, upon returning, repeat the identification process. Consequently, users frequently leave their workstations unattended after they have identified themselves, making the workstation vulnerable to abuse by others with physical access to it. Finally, all of these systems depend to some degree on installing special software and the software's correct functioning, which in turn depends on the software operating correctly and not being tampered with.

SUMMARY OF THE INVENTION

Accordingly, an object of the invention is to deter casual access to a circuit by unauthorized persons.

Another object is to do so passively and automatically, requiring no human intervention, and securing the circuits against wrongful access because of human error.

Another object is to deter casual access in work environments where centralized control of access, or continuous guarding against unauthorized access, is not possible.

Another object is to prevent spoofing of the circuit from casually obtained information, e.g. visual or aural information left carelessly insecure.

Another object is to prevent access to a circuit by any means simpler than direct physical altering of the circuit.

Another object is to permit the circuit to operate while externally accessible.

In accordance with these and other objects made apparent hereinafter, the invention concerns a system having a first circuit and a second circuit spatially mobile with respect to one another, and a third circuit having an input/output portion. The first and second circuits are in periodic communication with one another within a preselected spatial range, and the second circuit uses this communication to identify whether the first circuit is a preselected approved circuit. Upon failure to identify an approved circuit within a preselected time, the second circuit disables the input/output portion of the third circuit.

In so doing, the invention passively and automatically deters access to the third circuit (e.g. a computer workstation, or a decentralized collection of workstations) by anyone not in possession of a preselected approved circuit, deterring casual access to the third circuit, and does so without requiring any software specific to the third circuit (i.e. no security software on the computer). Because there are no visual user identification codes to key in before gaining access to the third circuit, the invention prevents spoofing the system because of human error, such as having left one's codes lying about where an unauthorized user could see them, or by having chosen weak passwords. Only physical intrusion into the second circuit would permit an unauthorized user to gain access, which is something that would be readily spotted and dealt with in most work areas. Because the invention necessarily disables only the input/output of the third circuit, the third circuit could still operate in isolation (e.g. running programs internally), saving lost work time.

These and other objects, features, and advantages are further understood from the following detailed description of particular embodiments of the invention. It is understood, however, that the invention is capable of extended application beyond the precise details of these embodiments. Changes and modifications can be made to the embodiments that do not affect the spirit of the invention, nor exceed its scope, as expressed in the appended claims. The embodiments are described with particular reference to the accompanying drawings, wherein:

BRIEF DESCRIPTION OF THE DRAWINGS

FIG. 3 is a schematic drawing illustrating an embodiment of the invention adapted for use with a personal computer, computer workstation, and the like.

DETAILED DESCRIPTION

Figure 1:
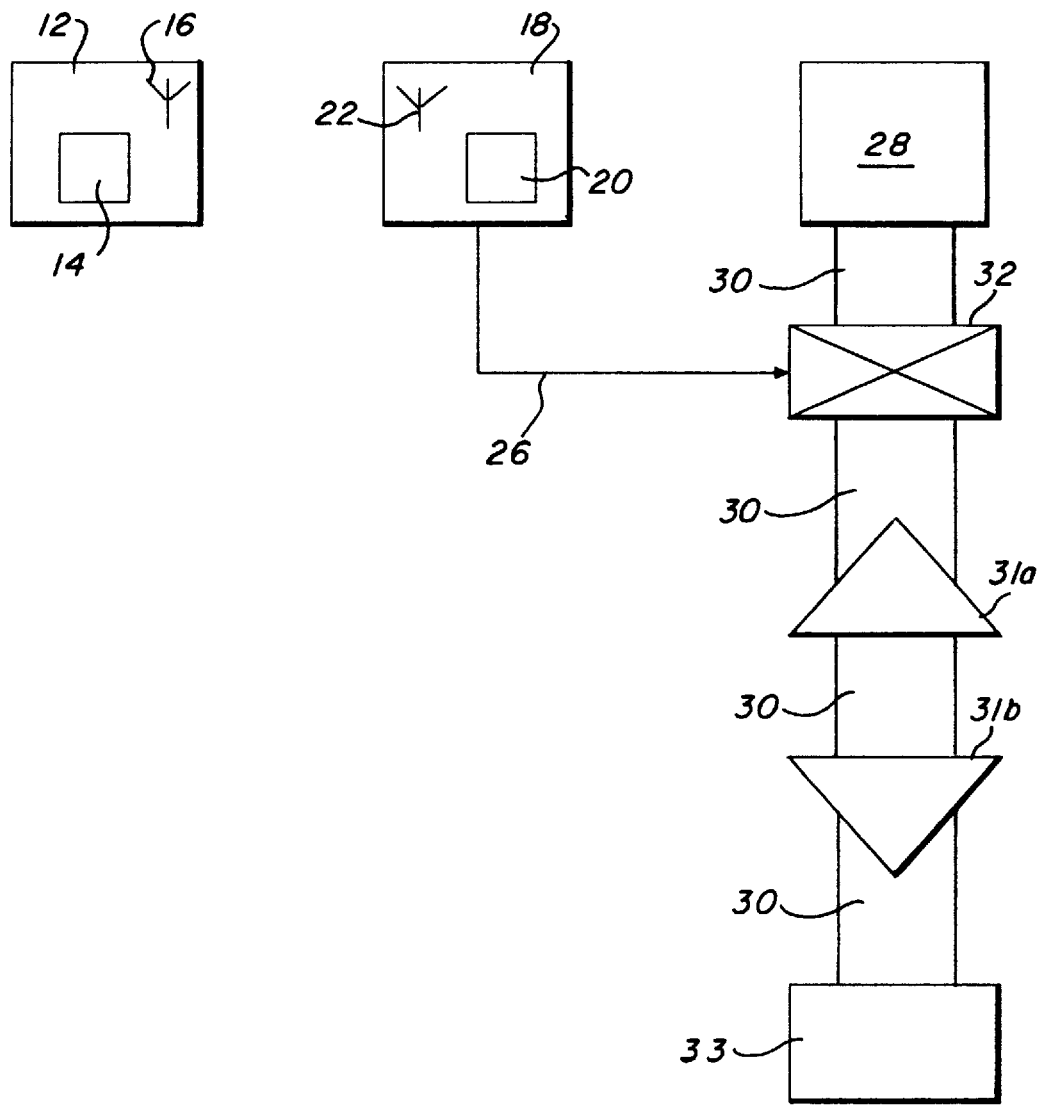
FIG. 1 is a block diagram illustrating an embodiment of the invention.

With reference to the drawing figures, wherein like numbers indicate like parts throughout the several views, FIG. 1 shows a first circuit 12, a second circuit 18, and a third circuit 28, in which the first and second circuits are spatially distant from one another. First circuit 12, for convenience called the "agent," has a transponder 16 for communicating with transmitter/receiver 22 of second circuit 18, the latter called the "detector" for convenience. Transmitter 16 and 22 are disposed to permit communication between agent 16 and detector 18 over limited distances. The transmitters are illustrated in FIG. 1 as antennas internal to each of circuits 16 and 18, and they preferably are so in order to permit free relative movement between agent 16 and detector 18 within the range of transmitters 16, 18, although one could practice this embodiment with physical wires disposed between circuits 12 and 18 to permit communication, so long as the wires permitted relative movement between the two circuits.

Agent 12 and detector 18 preferably have respective processors to direct these circuits, and direct communications sent from these circuits, in a manner discussed below. The processors are preferably programmable externally to permit greater flexibility in the use of these circuits. Detector 18 communicates to third circuit 28, and via link 2,6 to electronic interlock 32. Communication line 30 permits circuit 28 to communicate to one or more external circuits 33, with arrows 31a and 31b indicating that the communication between circuits 28 and 33 may be bi-directional. Interlock 32 is disposed to selectably permit or block communication along line 30 and may also disconnect power from circuit 28. Data line 30 may, of course, be a plurality of wires, data links, multiplexed lines, etc.

In operation, agent 12 and detector 18 periodically communicate with one another via transmitters/receivers 16 and 18 when the two circuits are within each other's spatial range. Processor 20 of detector 18 uses this communication to authenticate agent 12, i.e. identify whether agent 12 is an approved circuit, which, for example, could indicate that agent 12 corresponds to an electronic device given an approved user of circuit 28 to identify the user to detector 18. Upon favorable identification by processor 20, detector 18 opens interlock 32 to permit external access to circuit 28 via line 30. If detector 18 cannot authenticate agent 16 as a valid circuit within a preselected time, or agent 16 is out of communication range for the preselected time, detector 18 signals interlock 32 via link 26 to shut off communication along line 30, isolating circuit 28 from external communication. If detector 18 still cannot identify presence of a valid circuit within a further preselected time, detector 18 can preferably send a signal to shut down circuit 28, typically by disconnecting its power.

Figure 2:
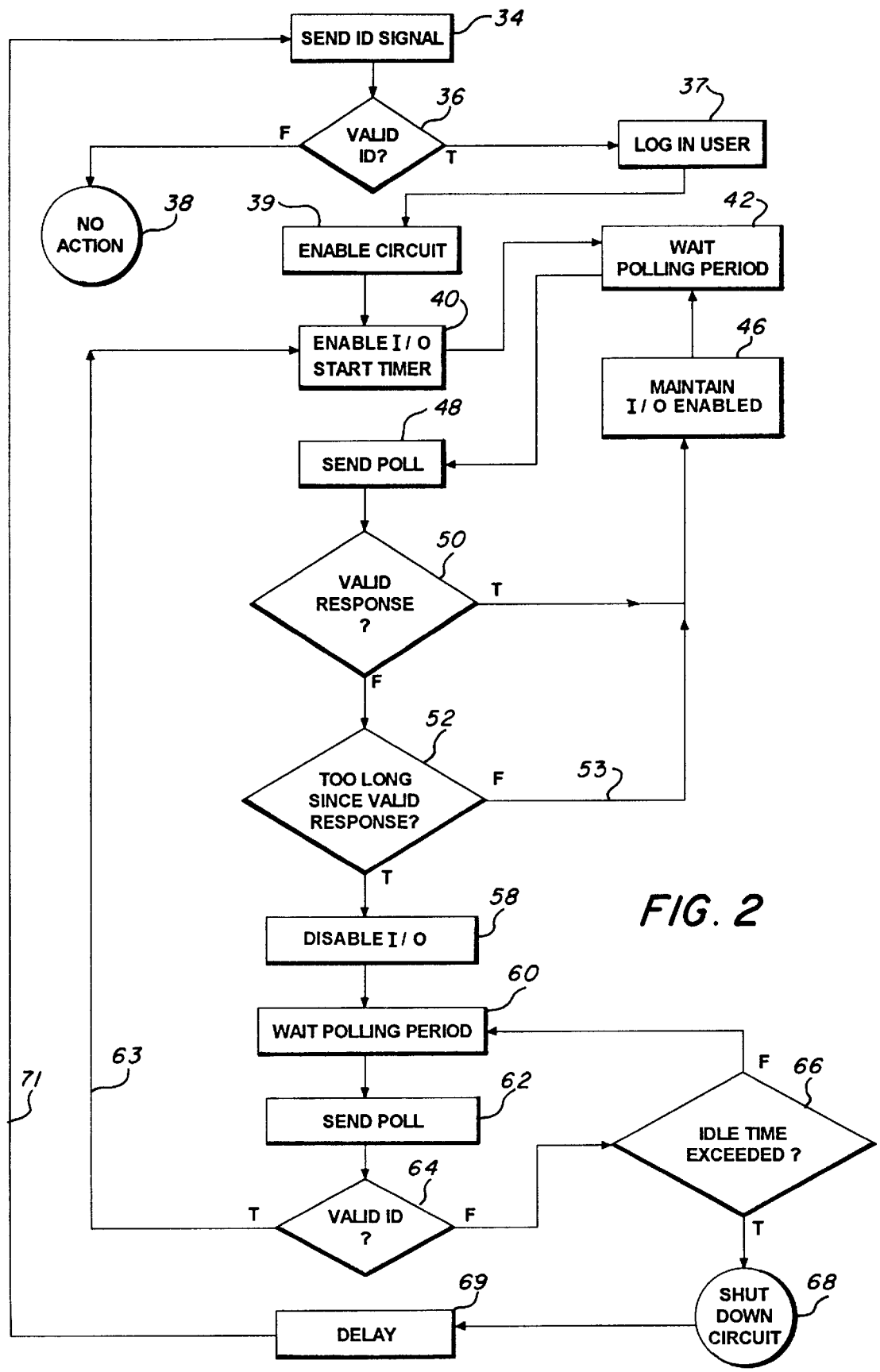
FIG. 2 is a flow chart illustrating operation of the embodiment of FIG. 1.

FIG. 2 illustrates a preferred way to operate the system of FIG. 1. Initially, interlock 32 is set to isolate circuit 28 from communication line 30 and circuit 28 is shut down. Agent 12 sends an identification signal (34) which detector 36 receives and tests for authenticity (36). If not authentic, detector 36 takes no further action (38) and circuit 28 remains isolated and shut down. If authentic, however, detector 18 logs on the authenticated user (37) and turns on circuit 28 (39), and causes interlock 32 to enable external input/output (39) between circuits 28, 33. Thereafter, processor 20 uses its timer to wait a preselected time (42), called the polling period for convenience, after which it causes transmitter 22 to send out a polling signal (48). If transmitter 16 of agent 12 is within range, it receives the polling signal, which processor 14 recognizes and responds with a signal identifying agent 12 to detector 18. If detector 18 authenticates the signal as from the logged in user/circuit (50), it maintains input/output enabled (46) and waits another polling period (42), whereupon detector 18 sends another poll (48) and repeats steps 42, 46, etc. If, however, detector 18 does not authenticate the signal (50), such as would happen if a user carrying agent 12 moved out of range and someone were then to send a spoofing signal, or if detector 18 does not receive any signal (50), detector 18 determines how long it has been since receiving a valid response (52). If not longer than some preselected time in excess of the polling period, detector 18 continues to send polls (52, 42). If longer, detector 18 disables input/output 30 (58), but still continues to send poll signals (60, 62). This preselected time is preferably short, e.g. three consecutive passes through decisions 50, 52, preferably as counted by processor 20. If detector 18 receives a response from its polls which detector 18 authenticates (64), it enables input/output 30 again (40, 63), and proceeds as before. If not, detector 18 times the period since having received an authentic poll response and determines if this idle time exceeds a preset limit (66). Before exceeding this time limit, detector 18 continues to poll for valid users (60, 62, 64); after exceeding this limit, it shuts down circuit 28 (68), waits for a time (69), and then waits again for a valid user ID (71, 34).

Figure 3:
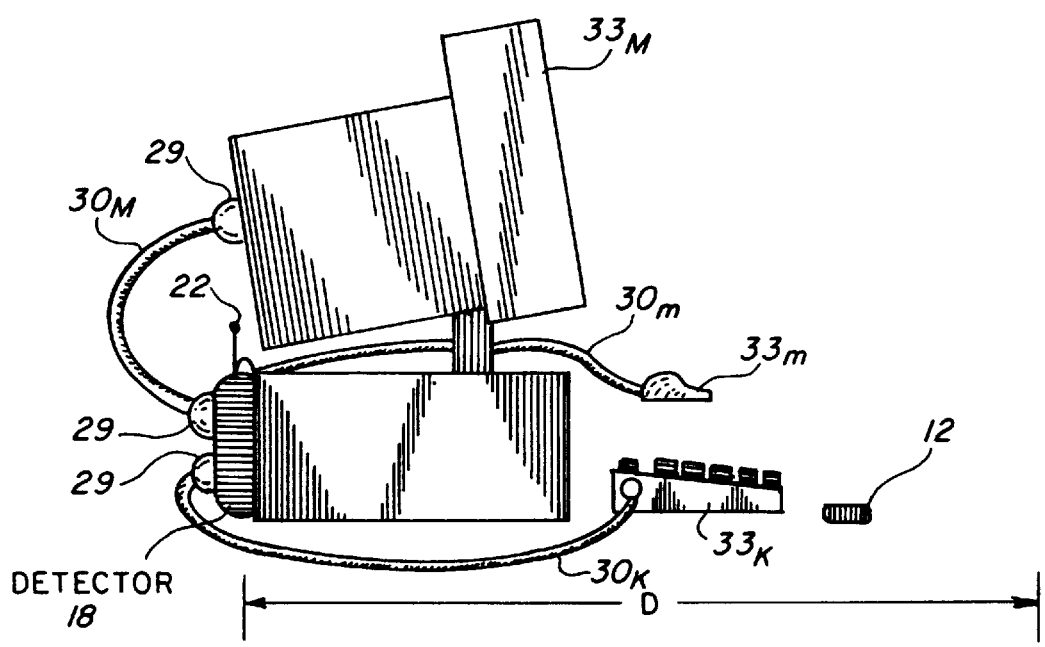

The value of this scheme is illustrated by the embodiment of FIG. 3, in which the circuit 28 is a personal computer/work station (for simplicity, hereafter "computer"), and external circuit 33 is, collectively, keyboard $33_k$, computer mouse $33_m$, and monitor $33_M$; and input/output link 30 is collectively the cables $30_k$, $30_m$, and $30_M$, which are the connections between computer 28 and, respectively, keyboard $33_k$, mouse $33_m$, and monitor $33_M$. These cables connect to detector 18 via a plurality of connectors 29, and, through detector 18, connect to computer 28. Internal to detector 18 is interlock 32 (not shown in FIG. 3), which permits detector 18 to mediate communications between circuits 28 and 33 as above described. Being internal, and detector 18 being physically attached to computer 28, ensures that once interlock 32 isolates computer 28 from input/output with peripherals $33_k$, $33_m$, $33_M$, one can access computer 28 only by valid use of agent 12, or by physically separating detector 18 from computer 28 and rewiring the peripherals to computer 28. This sort of intervention would be readily apparent in the sort of normal workplace where one would expect to find personal computers or workstations, and thus presence of detector 18 inherently deters unauthorized users from casually gaining access to computer 28. In this embodiment, agent 12 is shown as a small token which can be hand held, and put in a user's pocket or on key chain for convenience. Token 12 is located within range D over which it and detector 18 can effectively communicate, and in which token 12 can receive and respond to polls from detector 18.

In the embodiment of FIG. 3, the input/output devices which are disenabled by detector 18 are strictly those which the casual user would need for casual access to computer 28. In principle, one could also wholly isolate computer 28 which would also entail disconnecting computer 28's parallel and serial ports, and any other data ports which the computer may have. This, however, is not preferred because the invention seeks to secure computer 28 against wrongful access by the casual user. Doing more would likely disrupt work which a valid user would want continued in his absence, for example work which requires access to a data base in a central computer via an intranet, general access to the internet, access to e-mail, etc.

The polling time in the embodiment of FIG. 3 is preferably on the order of seconds in order to permit relatively rapid isolation of computer 28 upon, e.g., a user taking token 12 outside range D. The time thereafter in which detector 18 will keep computer 28 operating is preferably on the order of hours to permit a user to have longer absences from computer 28, e.g. lunch, without disturbing the user's work, which could be running on computer 28 despite its input/output being locked out. The idle time limit set in detector 18 preferably would be set to result in longer absences causing detector 18 to log out the user, freeing computer 28 for use by any other valid user. Absence of an authenticated polling response for several hours, such as one would expect occur after normal work hours, preferably would cause detector 18 to shut down power to computer 28. Of course, processor 20 will preferably permit these times to be configurable.

Figure 4:
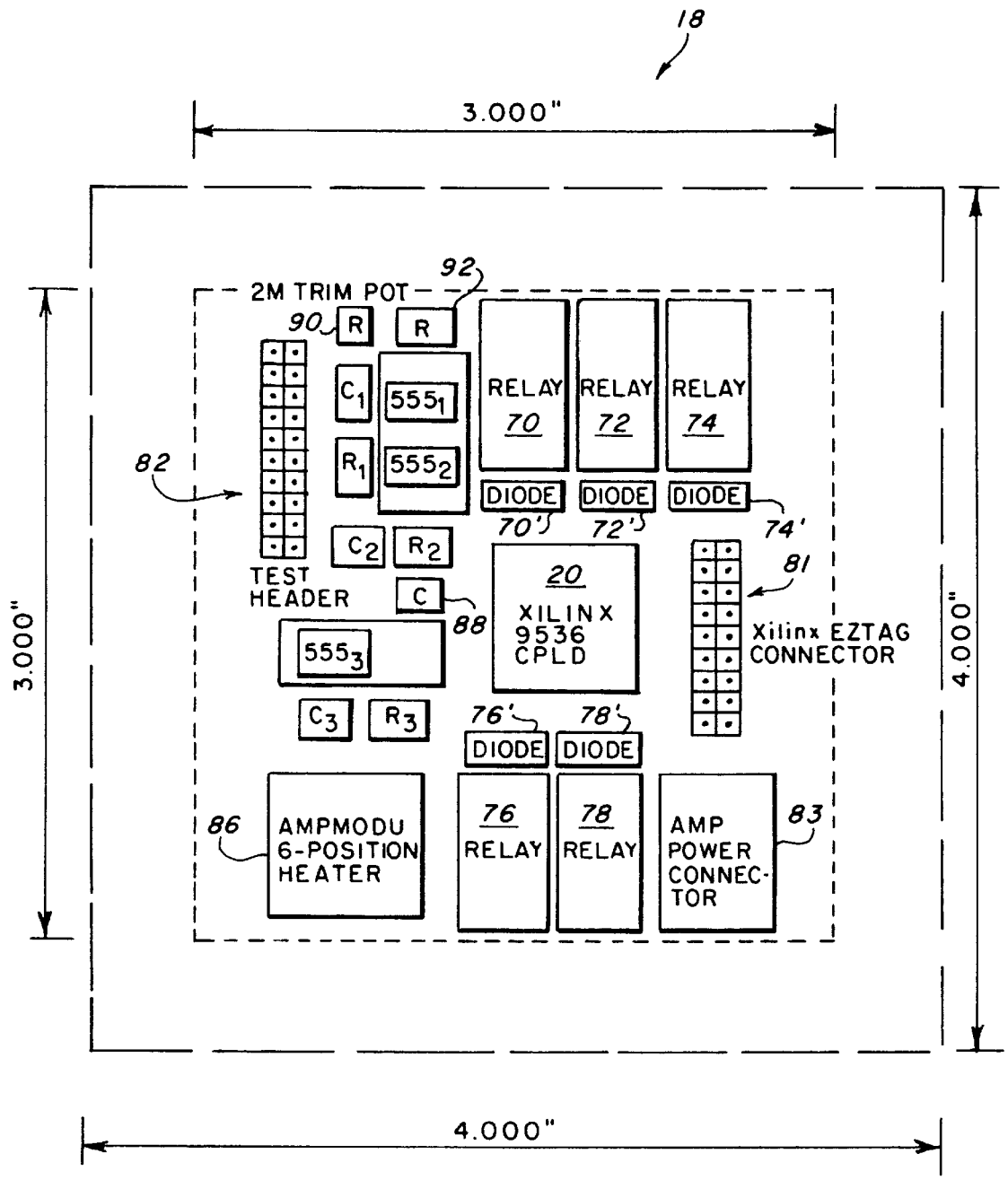
FIG. 4 is a plan view illustrating a circuit board which was for use as the above mentioned second circuit.

FIG. 4 shows an embodiment of the control portion of detector 18, in the form of a circuit board layout in the manner in the manner of detector 18 above described. Processor 20 can advantageously be a complex programmable logic device (CPLD), such as XILINX Corporation models 9536 or 9572. This particular model was chosen because of its commercial availability, ease in programming, and established track record. Connector 81 permits access to processor 20 for initial setup. Test header 82 permits direct external access to processor 20 for diagnostic testing. During operation, the voltages on the pins of header 82 are preferably monitored so that absence of an expected voltage can detect and alert users to physical tampering with detector 18. Connector 83 provides power to circuit board 18, and relays 70, 72, 74 connect monitor $^{33}$M to computer 28 responsive to commands from processor 20, the three relays corresponding to the red, green, and blue color feed needed by monitor $33_M$ to synthesize monitor colors. Diodes 70', 72', and 74' are respectively associated with these relays, and prevent inductive spikes from any of the relays' coils from damaging processor 20. Relays 76 and 78, along with their associated diodes 76' and 78', similarly connect mouse data signal $33_m$ and keyboard $33_k$ to computer 28 under the command of processor 20. Preferably, power connector 83 feeds power to computer 28 also, so that a power failure to board 18 also will cause a power failure to computer 28, maintaining its security. Header 86 connects external transmitter/receiver 22 (not shown in FIG. 4) with the circuit board, and ultimately processor 20. Timers $555_1$, $555_2$, and $555_3$ each have associated RC networks $R_1$ and $C_1$, $R_2$ and $C_2$, and $R_3$ and $C_3$. In accordance with its programming, processor 20 sets the bias potential for each of the timers, and at selected times causes $C_1$, $C_2$, or $C_3$ to charge. Thus, for example, at the beginning of a polling period, processor 20 causes capacitor $C_1$ to charge, with the characteristic time constant proportional to $R_1C_1$. As the potential across capacitor $C_1$ rises, it eventually reaches the bias potential of timer $555_1$, which changes its output state, signalling processor 20, which subsequently reinitiates the cycle. In this manner, detector 18 generates a plurality of timing periods which are available to detector 18, e.g. the idle time period and time period to shutdown described above. These, together with the counter in processor 20, constitute the timer of detector 18. Circuits such as timers 555 are preferred for tracking times significantly longer than the polling period, because to do so using digital counters would be inordinately expensive. Capacitor 88 connects in parallel with the outputs of timers $555_1$, $555_2$, and $555_3$ to isolate processor 20 from transition voltage spikes. Resistor trim pots 90, 92 permit conventional fine tuning of the RC time constants.

Figure 5:
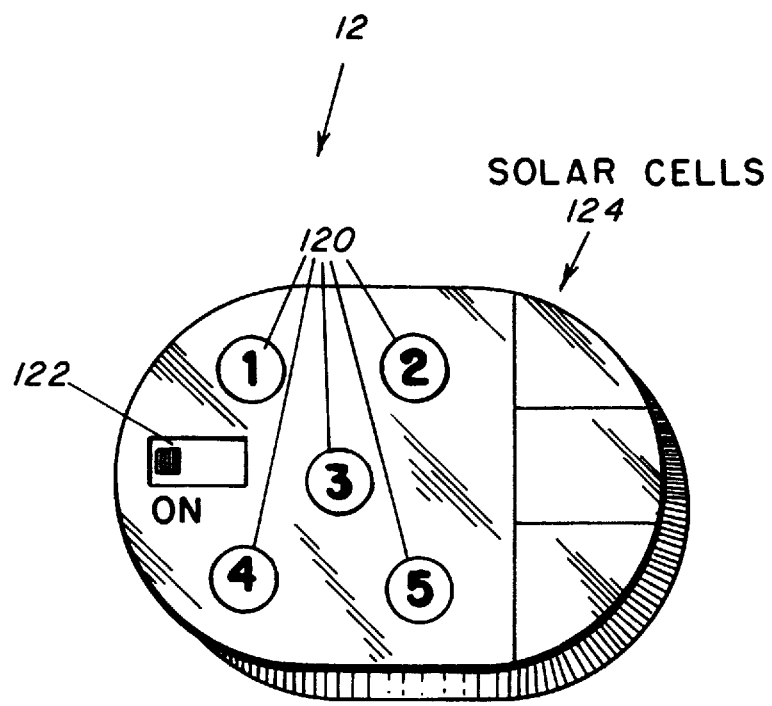
FIG. 5 is a plan view illustrating the layout of a token useable as the above mentioned first circuit.

FIG. 5 shows agent 12 in the form of a hand held token. Switch 122 permits disconnecting of power to agent 12 to conserve power. Buttons 120 permit a user to key information into processor 14 (not shown in FIG. 5), such as a PIN or other identification number necessary to start operation of the circuit. Token 12 may also be powered by solar cells 124 to reduce or eliminate the need to replace batteries. This could permit token 12 to be hermetically sealed, which would further reduce the likelihood of tampering.

In operation, a user taps buttons 120 to key in a code which identifies him to processor 14, and whereupon processor enables the circuit of token 12 to receive, and respond to, polls from detector 18. Token 12's response can be a fixed digital signal, but preferably is encrypted or otherwise varied in accordance with known IFF (identification friend or foe) techniques to protect against compromise of the system by spoofing and replay as happens frequently to cellular phones. Token 12 may also have separate buttons (not shown) by which a user can send a direct command to start or disconnect computer 28.

The invention has been described in what is considered to be the most practical and preferred embodiments. It is recognized, however, that obvious modifications to these embodiments may occur to those with skill in this art. Accordingly, the scope of the invention is to be discerned from reference to the appended claims, wherein:

We claim:

1. A system comprising:
   a first circuit and a second circuit spatially mobile with respect to one another, and a third circuit comprising an input/output portion effective for electronic communication outside said third circuit via said input/output portion;
   said first and second circuits being adapted to be in periodic communication with one another within a preselected spatial range;
   said second circuit is adapted, responsive to said periodic communication, to identify whether said first circuit is a preselected approved circuit;
   said second circuit is further adapted, upon failure of said second circuit to identify said approved circuit within a preselected time, to disable said input/output portion of said third circuit effective to prevent said electronic communication.

2. The system of claim 1, wherein said second circuit is effective, responsive to identifying said first circuit as said preselected approved circuit, to enable said electronic communication.

3. The system of claim 1, wherein said periodic communication comprises:
   a poll signal from said second circuit, and
   a preselected response signal from said first circuit generated responsive to said poll signal.

4. The system of claim 3, wherein:
   said second circuit is effective, responsive to identifying said first circuit as said preselected approved circuit, to enable said electronic communication;
   said third circuit is a computer;
   said second circuit comprises at least one member of the set whose members are: a keyboard operatively connected to said computer, a mouse operatively connected to said computer, and a monitor operatively connected to said computer;
   said second circuit comprises a programmable digital processor operatively disposed effective to permit said second circuit to identify whether said first circuit is a preselected approved circuit, and to prevent said electronic communication
   said first circuit is adapted to be carried by a human being;
   said second circuit is adapted to be attached to said third circuit;
   said third circuit receives its power from said second circuit, effective for shut down of said second circuit to cause shutdown of said third circuit.

5. The system of claim 1, wherein said third circuit is a computer.

6. The system of claim 1, wherein said second circuit comprises at least one member of the set whose members are: a keyboard operatively connected to said computer, a mouse operatively connected to said computer, and a monitor operatively connected to said computer.

7. The system of claim 6, wherein said at least one member comprises a keyboard operatively connected to said computer, a mouse operatively connected to said computer, and a monitor operatively connected to said computer.

8. The system of claim 1, wherein said second circuit comprises a programmable digital processor operatively disposed effective to permit said second circuit to identify whether said first circuit is a preselected approved circuit, and to prevent said electronic communication.

9. The system of claim 1, wherein said first circuit is adapted to be carried by a human being.

10. The system of claim 1, wherein said third circuit is a computer, and said second circuit is a circuit board comprising a programmable digital processor.

11. The system of claim 1, wherein said second circuit is adapted to be attached to said third circuit.

12. The system of claim 1, wherein said third circuit receives its power from said second circuit, effective for shut down of said second circuit to cause shutdown of said third circuit.

13. The system of claim 1, wherein said second circuit is further adapted, responsive to said failure of said second circuit to identify whether said first circuit is a preselected approved circuit within said first preselected time, to disconnect power to said third circuit upon failure of said second circuit to identify said first circuit as a preselected approved circuit within a further preselected time following said first preselected time.

* * * * *